(12) United States Patent
Uchida

(10) Patent No.: US 10,698,347 B2
(45) Date of Patent: Jun. 30, 2020

(54) ELECTROPHOTOGRAPHIC BELT AND IMAGE FORMING APPARATUS

(71) Applicant: CANON KABUSHIKI KAISHA, Tokyo (JP)

(72) Inventor: Kouichi Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/699,835

(22) Filed: Dec. 2, 2019

(65) Prior Publication Data

US 2020/0174405 A1 Jun. 4, 2020

(30) Foreign Application Priority Data

Dec. 4, 2018 (JP) ................................. 2018-227577
Oct. 15, 2019 (JP) ................................. 2019-188745

(51) Int. Cl.
*G03G 15/20* (2006.01)
*G03G 15/16* (2006.01)
*C08L 77/12* (2006.01)
*C08L 67/02* (2006.01)

(52) U.S. Cl.
CPC .......... *G03G 15/1615* (2013.01); *C08L 67/02* (2013.01); *C08L 77/12* (2013.01); *G03G 2215/1623* (2013.01)

(58) Field of Classification Search
USPC ................. 399/159, 162, 297, 302, 308, 313
See application file for complete search history.

(56) References Cited

U.S. PATENT DOCUMENTS

| 5,296,276 | A | * | 3/1994 | Maruyama | B29C 55/28 428/35.7 |
|---|---|---|---|---|---|
| 9,034,476 | B2 | | 5/2015 | Uchida | |
| 9,261,803 | B2 | | 2/2016 | Uchida | |
| 9,744,732 | B2 | | 8/2017 | Uchida | |
| 9,753,411 | B2 | | 9/2017 | Uchida | |
| 10,551,771 | B2 | | 2/2020 | Uchida | |
| 2014/0197578 | A1 | | 7/2014 | Uchida | |

FOREIGN PATENT DOCUMENTS

| JP | 2001-018284 | 1/2001 |
|---|---|---|
| JP | 2007-024954 | 2/2007 |
| JP | 2010-054942 | 3/2010 |
| JP | 2014-114394 | 6/2014 |

* cited by examiner

*Primary Examiner* — Hoan H Tran
(74) *Attorney, Agent, or Firm* — Venable LLP

(57) ABSTRACT

Provided is an electrophotographic belt having excellent creep resistance and digital reproducibility. The electrophotographic belt is composed of a biaxially stretched cylindrical film, and the film includes a matrix including a thermoplastic resin and an electroconductive domain including an ionic electroconductive agent, and when a surface resistivity of the film in a circumferential direction is defined as A, and a surface resistivity of the film in a direction orthogonal to the circumferential direction is defined as B, A≥B is satisfied, and a tensile modulus of elasticity of the film in the circumferential direction is 1.0 GPa or more and 3.0 GPa or less.

11 Claims, 4 Drawing Sheets

ELECTROPHOTOGRAPHIC BELT AND IMAGE FORMING APPARATUS

BACKGROUND OF THE INVENTION

Field of the Invention

The present invention relates to an electrophotographic belt such as a conveyance transfer belt or an intermediate transfer belt used in an electrophotographic image forming apparatus and the like such as a copying machine or a printer, and also relates to an electrophotographic image forming apparatus provided with the electrophotographic belt.

Description of the Related Art

In an electrophotographic image forming apparatus, an endless-shaped electrophotographic belt made of a thermoplastic resin is used as a conveyance transfer belt for conveying a transfer material or an intermediate transfer belt. Such an electrophotographic belt is usually used while being stretched between rollers in the electrophotographic image forming apparatus, but may be deformed (hereinafter, also referred to as "creep") due to long-term use.

Japanese Patent Application Laid-Open No. 2007-24954 discloses a method for heating a preform made from a thermoplastic resin composition, stretching the preform in a mold by a stretching rod, and introducing gas into the preform stretched by the stretching rod to inflate the preform. This discloses a method for obtaining a bottle-shaped molded product and cutting an endless-shaped electrophotographic belt from the bottle-shaped molded product.

The electrophotographic belt manufactured by the method described in Japanese Patent Application Laid-Open No. 2007-24954 is stretched (biaxially stretched) in both a circumferential direction and a direction orthogonal to the circumferential direction, and as a result, is excellent in creep resistance. However, according to the study by the present inventors, when the electrophotographic image was formed using the electrophotographic belt stretched biaxially as the intermediate transfer belt, the following phenomenon may sometimes occur. That is, when a toner image carried on an outer peripheral surface of the electrophotographic belt is transferred onto paper (secondary transfer process), the transfer position of the toner on the recording medium deviates from the position that should be originally transferred, and the image quality deteriorates.

In order to more faithfully reproduce digital data as the electrophotographic image, the present inventors have recognized that the deviation of the toner transfer position during the secondary transfer is a problem to be solved.

SUMMARY OF THE INVENTION

An aspect of the present disclosure relates to providing an electrophotographic belt that is excellent in creep resistance and can prevent a transfer position of a toner from being shifted during secondary transfer.

Another aspect of the present disclosure is directed to providing an electrophotographic image forming apparatus capable of forming a high-quality electrophotographic image.

According to one aspect of the present disclosure, an electrophotographic belt is composed of a biaxially stretched cylindrical film, in which the biaxially stretched cylindrical film includes: a matrix including a thermoplastic resin; and an electroconductive domain including an ionic electroconductive agent, and when a surface resistivity of the biaxially stretched cylindrical film in a circumferential direction on an outer peripheral surface thereof is defined as A ($\Omega/\square$), and a surface resistivity of the biaxially stretched cylindrical film in a direction orthogonal to the circumferential direction on the outer peripheral surface thereof is defined as B ($\Omega/\square$), A≥B is satisfied, and a tensile modulus of elasticity of the biaxially stretched cylindrical film in the circumferential direction is 1.0 GPa or more and 3.0 GPa or less.

According to another aspect of the present disclosure, there is provided an electrophotographic image forming apparatus including the electrophotographic endless belt as an intermediate transfer belt.

Further features of the present invention will become apparent from the following description of exemplary embodiments with reference to the attached drawings.

DESCRIPTION OF THE EMBODIMENTS

Figure 1:
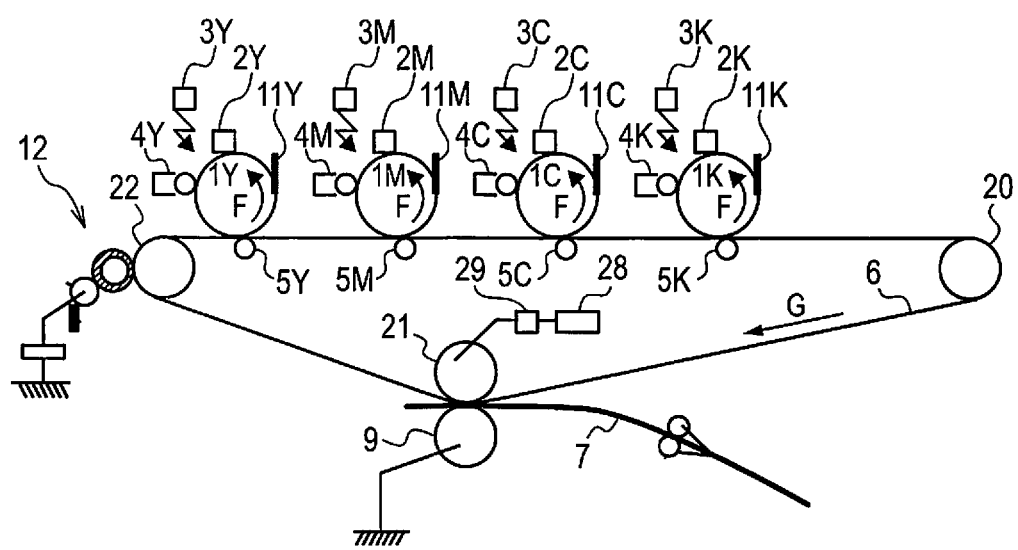
FIG. 1 is a schematic view illustrating an example of a full-color image forming apparatus using an electrophotographic process.

In case of using the conventional biaxially stretched electrophotographic belt as an intermediate transfer belt, the present inventors have made further researches in order to elucidate the cause of the phenomenon that a transfer position of a toner shifts during a secondary transfer as described above. In the process, it was found that electric discharge was generated between an electrophotographic belt and a photosensitive drum even at a position other than a nip portion between the electrophotographic belt and the photosensitive drum. The present inventors presumed that the transfer position of the toner was disturbed by the electric discharge generated at a position other than the nip portion.

That is, as described in Japanese Patent Application Laid-Open No. 2007-24954, the conventional biaxially stretched electrophotographic belt heats a preform having a test tube shape and is stretched in a longitudinal direction using a stretching rod. At the same time, the biaxially stretched electrophotographic belt is manufactured by flowing gas into the preform to inflate the preform and increase a diameter of the preform.

When producing a biaxially stretched cylindrical film by such a method, it is general that Y/X is set to be greater than 1, where X is a stretch ratio in an axial direction and Y is a stretch ratio in a circumferential direction. The reason is that increasing the stretch ratio Y in the circumferential direction is advantageous in improving a creep resistance of the electrophotographic belt.

As described above, in the biaxially stretched cylindrical film at the stretch ratio where Y/X exceeds 1, a domain containing an ionic electroconductive agent extends longer in the circumferential direction of the electrophotographic belt. As a result, the electroconductivity of the electrophotographic belt in the circumferential direction is higher than that in the direction (axial direction) orthogonal to the circumferential direction. Therefore, it is considered that when a predetermined transfer voltage is applied to the nip portion during the secondary transfer, more electricity flows in the circumferential direction than in the axial direction of the electrophotographic belt to cause electric discharge outside the nip portion.

The present inventors have thought that in the biaxially stretched electrophotographic belt, if the electroconductivity in the circumferential direction can be equal to or less than that in the axial direction, the electric discharge outside the nip portion is suppressed and the transfer position of the toner could be prevented from being disturbed during the secondary transfer while ensuring the creep resistance. Based on such considerations, the present inventors have repeatedly studied for the purpose of obtaining the electrophotographic belt capable of preventing the position of the toner transfer from being disturbed during the secondary transfer.

As a result, it was found that the electrophotographic belt composed of the biaxially stretched cylindrical film in which a tensile modulus of elasticity in the circumferential direction is 1.0 GPa or more and 3.0 GPa or less, and A≥B is satisfied when a surface resistivity in a circumferential direction on an outer circumferential surface thereof is A (Ω/□) and a surface resistivity in a direction orthogonal to the circumferential direction on the outer circumferential surface thereof is B (Ω/□) can satisfactorily achieve the above object.

Such an electrophotographic belt can be obtained, for example, by reducing the stretch ratio Y of the preform in the circumferential direction within a range in which the creep resistance is not damaged when producing the biaxially stretched cylindrical film to reduce a value of Y/X. Specifically, for example, there may be a method using a preform in which a ratio (length/inner diameter) of an inner diameter to a length is smaller than that of the conventional preform as a preform to be subjected to the biaxial stretching forming. That is, by using a preform having a relatively larger inner diameter, the stretch ratio in the circumferential direction for obtaining an electrophotographic belt having a predetermined inner diameter can be made relatively smaller. As a result, the value of Y/X can be reduced, and the electrophotographic belt having the above physical properties can be obtained.

Hereinafter, the biaxially stretched cylindrical film and each material forming the film will be described.

<Biaxially Stretched Cylindrical Film>

In the biaxially stretched cylindrical film, a resin is stretched in a circumferential direction and in a direction (hereinafter, also referred to as "axial direction") orthogonal to the circumferential direction.

<Thermoplastic Resin>

A thermoplastic resin is not particularly limited as long as biaxial stretching can be made.

Examples of the biaxially stretchable thermoplastic resins include polyethylene, polypropylene, polystyrene, polyester, polycarbonate, and polyamide. Among these, the polyester and the polyamide are preferable in view of the strength required for the electrophotographic belt.

Examples of the polyester include polyethylene terephthalate and polyethylene naphthalate. As the polyester, at least one selected from the group consisting of polyethylene terephthalate and polyethylene naphthalate, may preferably be employed.

In addition, examples of the polyamide include polymetaxylylene adipamide. These thermoplastic resins can be used alone or in combination of two or more.

<Ionic Electroconductive Agent>

Examples of the ionic electroconductive agent include a polymer type antistatic agent, an ionic electrolyte, and an ionic liquid. These can be used alone or in combination of two or more. The ionic electrolyte and the ionic liquid can impart desired electroconductivity in a relatively small amount.

Examples of the polymer type antistatic agent include polyethylene oxide, polyethylene oxide copolymer, polyether ester amide, polyether ester, polyether amide, a partially crosslinked polyethylene oxide copolymer, and an ionomer. Here, examples of the ionomer include a polymer that has an alkali metal salt of carboxylic acid, an alkali metal salt of sulfonic acid, or a quaternary ammonium salt in a side chain.

The ionic electrolyte or the ionic liquid is composed of a cation component and an anion component.

Examples of the cation components include metal ions such as imidazolium ion, pyridinium ion, ammonium ion, phosphonium ion, sulfonium ion, lithium or potassium, sodium, and cesium.

Examples of the anion components include $AlCl_4^-$, $Al_2Cl_7^-$, $NO_3^-$, $BF_4^-$, $PF_6^-$, $CH_3COO^-$, $CF_3COO^-$, $CF_3SO_3^-$, $(CF_3SO_2)_2N^-$, $(CF_3SO_2)_2C^-$, $AsF_6^-$, $SbF_6^-$, and the like.

Examples of other anion components include $F(HF)n^-$ (n=integer from 1 to 4), $CF_3(CF_2)_3SO_3^-$, $(CF_3CF_2SO_2)_2N^-$, $(CF_3CF_2CF_2CF_2SO_2)_2N^-$, $CF_3CF_2CF_2COO^-$, $ClO_4^-$, and the like.

Among these anion components, that containing an electron-withdrawing fluorine atom is more preferable from the viewpoint of delocalizing negative charges in the anion, reducing electrostatic interaction with the cation, facilitating ion dissociation, and the like.

In particular, $(CF_3SO_2)_2N^-$, $(CF_3CF_2SO_2)_2N^-$, and $(CF_3CF_2CF_2CF_2SO_2)_2N^-$ are preferable. By combining the anionic component with the cation component, those that become a liquid at room temperature are generally called an ionic liquid, and those that do not become a liquid at room temperature are called an ionic electrolyte, and the ionic liquid particularly preferably contains an anion represented by the following Formula (1).

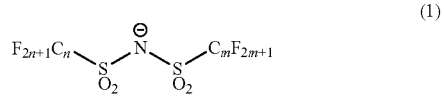

(1)

(In the above Formula 1, n represents an integer of 1 to 4, and m represents an integer of 1 to 4)

<Matrix Domain Structure>

An electrophotographic endless belt has a matrix containing a thermoplastic resin and an electroconductive domain containing an ionic electroconductive agent.

It can be confirmed by the following method that the electrophotographic endless belt has a matrix domain structure composed of the matrix containing the thermoplastic resin and a domain having the ionic electroconductive agent. For example, a sample collected from the electrophotographic endless belt can be confirmed by observation with an electron microscope and analysis with an X-ray analyzer, and the detailed method thereof will be described later.

A shape or a size of the domain dispersed in the matrix is not particularly limited. However, in the case of an intermediate transfer belt, the electrophotographic endless belt moves a substantially spherical toner by an action of electrostatic force, and therefore the domain preferably has a spherical shape, an elliptical shape, or a rod shape. In addition, the diameter of the domain is preferably 1 nm (0.001 μm) or more and 10 μm or less, and particularly preferably 1 μm or more and 5 μm or less. When the diameter of the domain is in the above range, electroconductivity can be stably imparted to the electrophotographic belt. Further, it is possible to suppress the domain from affecting the transferability of the toner. Here, the diameter of the domain is defined as a diameter of a circle having the same area as the area of the domain made of the ionic electroconductive agent that can be recognized when an outer surface of the electrophotographic endless belt is observed with an electron microscope.

A content of the thermoplastic resin is preferably 50% by mass or more, particularly 60% by mass or more, and more preferably 70% by mass or more with respect to a total mass of a resin composition containing the ionic electroconductive agent. When the content is 50% by mass or more, the durability of the electrophotographic belt can be further prevented from being lowered.

<Additives>

The electrophotographic endless belt may contain other additives in the range in which the effects of the present disclosure are not impaired. Examples of other additives include an electroconductive polymer, an antioxidant (for example, hindered phenol type, phosphorus type, sulfur type, and the like), an ultraviolet absorber, an organic pigment, an inorganic pigment, a pH adjuster, a crosslinking agent, a compatibilizer and a hydrolysis inhibitor. Other example of other additives includes a release agent (for example, silicone type, fluorine type, and the like), a coupling agent, a lubricant, an insulating filler, and an electroconductive filler.

Here, examples of the insulating filler include zinc oxide, barium sulfate, calcium sulfate, barium titanate, potassium titanate, strontium titanate, titanium oxide, magnesium oxide, magnesium hydroxide, aluminum hydroxide, talc, and mica.

Examples of other insulating fillers include clay, kaolin, hydrotalcite, silica, silicone particles, alumina, ferrite, calcium carbonate, barium carbonate, and nickel carbonate.

Other examples of other insulating fillers include glass powder, quartz powder, glass fiber, alumina fiber, potassium titanate fiber, and fine particles of thermosetting resin. Here, examples of the electroconductive filler include carbon black, carbon fiber, carbon nanotube, carbon nanofiber, electroconductive titanium oxide, electroconductive tin oxide, and electroconductive mica. These can be used alone or in combinations of two or more.

<Electrophotographic Endless Belt>

A thickness of the electrophotographic endless belt is preferably 10 μm or more and 500 μm or less, and particularly preferably 30 μm or more and 150 μm or less. Further, the electrophotographic endless belt according to the present disclosure may be used as a belt shape, or may be used with being wound around or coated on a drum, a roll, or the like used as an electrophotographic member. In addition, for the purpose of improving toner releasability from the electrophotographic endless belt according to the present disclosure, the electrophotographic endless belt is used as a base layer and a surface layer can be formed thereon. The electrophotographic endless belt may have another layer provided between the base layer and the surface layer, on an inner surface of the base layer, and on the surface layer.

In addition, the use of the electrophotographic endless belt according to the present invention is not particularly limited, but for example, the electrophotographic endless belt is suitably used for an intermediate transfer belt, a conveyance transfer belt, a photosensitive belt, and the like. In particular, the electrophotographic endless belt can be suitably used as the intermediate transfer belt.

When the electrophotographic endless belt is used as the intermediate transfer belt, the surface resistivity is preferably $1 \times 10^2 \Omega/\square$ or more and $1 \times 10^{14} \Omega/\square$ or less. If the surface resistivity is $1 \times 10^2 \Omega/\square$ or more, the resistance can be prevented from being extremely lowered, the transfer electric field can be easily obtained, and the occurrence of image omission and roughness can be prevented excellently. If the surface resistivity is $1 \times 10^{14} \Omega/\square$ or less, the increase in the transfer voltage can be suppressed. Accordingly, it is possible to suppress the increase in the size and cost of a power supply.

The surface resistivity A of the electrophotographic endless belt in the circumferential direction on the outer peripheral surface thereof needs to be the same as or higher than the surface resistivity B of the electrophotographic endless belt in the direction orthogonal to the circumferential direction on the outer peripheral surface thereof. If the surface resistivity A is lower than the surface resistivity B, a large amount of discharge is generated outside the nip portion between a photosensitive member and the electrophotographic endless belt. As a result, toner scattering increases and digital reproducibility decreases.

In this case, both values of the surface resistivity A and the surface resistivity B are preferably $1 \times 10^8 \Omega/\square$ or more and $1 \times 10^{12} \Omega/\square$ or less.

Making the surface resistivity A equal to or higher than the surface resistivity B can be adjusted by optimizing the addition amount of the ionic electroconductive agent, and adjusting the stretch ratio in the axial direction orthogonal to the circumferential direction at the time of producing the endless belt to be equal to or greater than the stretch ratio in the circumferential direction. The stretch ratio is adjusted to be appropriately optimized depending on the type of thermoplastic resin used.

A tensile modulus of elasticity of the electrophotographic endless belt in the circumferential direction needs to be 1.0 GPa or more and 3.0 GPa or less. If the tensile modulus of elasticity is less than 1.0 GPa, the biaxial stretching may not be sufficiently performed, and the creep may be insufficient. If the tensile modulus of elasticity exceeds 3.0 GPa, the biaxial stretching is sufficiently performed, but the electrophotographic endless belt becomes too hard, the elastic recovery does not occur and the creep may be insufficient.

Note that the tensile modulus of elasticity in the axial direction orthogonal to the circumferential direction is equal to or higher than that in the circumferential direction because the stretch ratio is equal to or greater than that in the circumferential direction. However, if the tensile modulus of elasticity in the axial direction becomes too high, the electrophotographic endless belt tends to be broken in the axial direction, and as a result, the tensile modulus of elasticity in the axial direction is preferably 4.0 GPa or less. Usually, this can be achieved by setting the stretch ratio in the axial direction to be twice or less the stretch ration in the circumferential direction.

The electrophotographic endless belt according to the present disclosure preferably has an uneven shape such as a groove on the outer peripheral surface. Since the outer surface has an uneven shape, a contact area with other contact members such as a cleaning blade can be reduced, and the adhesion of the toner to the outer surface can be further reduced.

The method for providing an uneven shape is not particularly limited, but for example, there may be a method in which the intermediate transfer belt having the surface layer supported by a core or the like is rotated in a circumferential direction while being in contact with a wrapping film containing abrasive grains, and a surface of the surface layer is polished to impart an uneven shape. In addition, a method such as imprinting for contacting a mold that has been processed in a desired shape in advance can be used.

Figure 4:
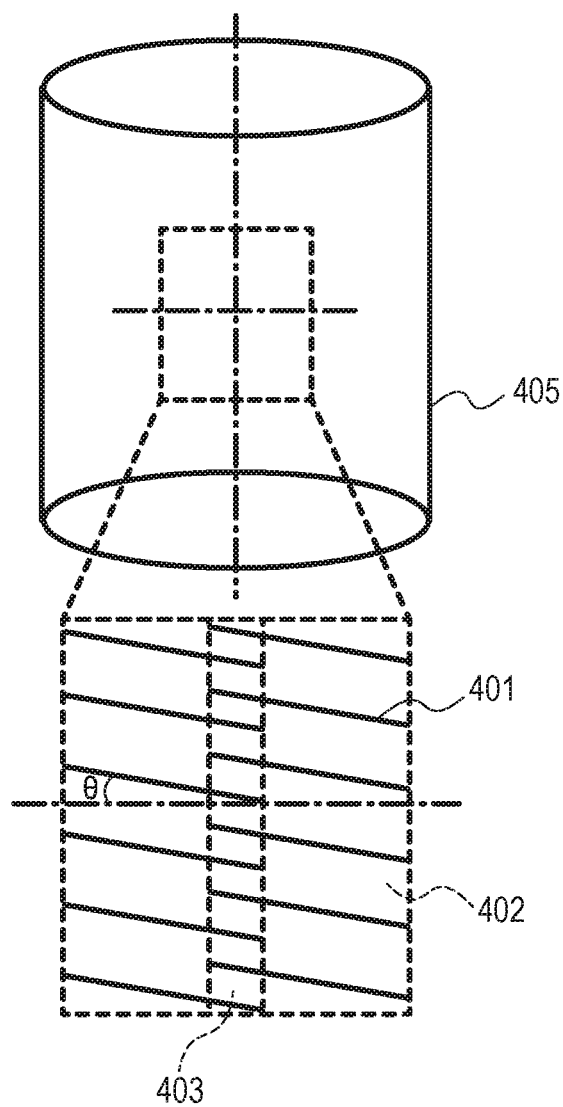
FIG. 4 is an explanatory diagram of an electrophotographic belt according to another embodiment of the present disclosure having grooves on an outer surface thereof.

FIG. 4 is an explanatory diagram of an electrophotographic belt according to another embodiment of the present disclosure having grooves on an outer surface thereof. Grooves 401 are provided on an outer peripheral surface of an electrophotographic belt 405 (hereinafter, also referred to as "outer surface"). Each of the grooves 401 intersects a direction orthogonal to a circumferential direction of the electrophotographic belt 405 and extends in non-parallel to the circumferential direction. Specifically, each of the grooves 401 preferably has a narrow angle θ exceeding 0° and less than ±3° with respect to the circumferential direction. More preferably, the narrow angle 9 is less than ±1°. When the narrow angle formed by the grooves 401 with respect to the circumferential direction is within the above range, the portion of the cleaning blade that contacts the region sandwiched between the two adjacent grooves 401 of the electrophotographic belt is not fixed, and therefore only the portion can be suppressed from being worn.

The grooves 401 are provided on the outer surface of the electrophotographic belt. The outer surface of the electrophotographic belt has only a first region 402 in which the number of grooves in the direction orthogonal to the circumferential direction is n, and a second region 403 in which the number of grooves in the direction orthogonal to the circumferential direction is greater than n. The first region and the second region are alternately arranged in the circumferential direction. The number n of grooves 401 is an integer of 1 or greater, and is not particularly limited as long as the toner cleaning can be performed stably, but is preferably 2,000 to 120,000. When the number of grooves 401 is 2,000 or more, the frictional force generated between the cleaning blade and the electrophotographic belt 405 can be reduced by reducing the area of the portion of the cleaning blade that comes into contact with the portion not provided with the groove 401. When the number of grooves 401 is 120,000 or less, the toner on the groove 401 can be transferred better.

The number of grooves in the second region is preferably 2n−10 or more and 2n+10 or less. When the number of grooves in the second region is 2n−10 or more, the change in the location of the contact portion of the cleaning blade at the boundary between the first region and the second region can be stably generated. Further, when the number of grooves in the second region is 2n+10 or less, the toner on the grooves can be transferred better.

For each of the grooves, intervals between adjacent grooves are not particularly limited, but are preferably approximately equal from the viewpoint of the toner cleaning. By equalizing the interval, the local wear of the blade can be suppressed.

The circumferential length of the second region is preferably 0.01 to 50 mm. In addition, each of the grooves may be discontinuous in the circumferential direction, and the second region may include ends of each groove. When the circumferential length of the second region is 50 mm or less, the toner on the groove can be transferred better.

There is at least one second region on the outer surface of the electrophotographic belt 405. In particular, one to three second regions are preferably present, and two to three second regions are more preferably present in the circumferential direction. Since two to three second regions are present in the circumferential direction of the electrophotographic belt, the toner on the groove can be transferred better.

A depth of the groove 401 is preferably 0.10 µm or more and less than 5.0 µm, and more preferably 0.20 µm or more and less than 2.0 µm. By setting the depth of the groove within the above range, the contact state of the cleaning blade with the electrophotographic belt can be stabilized over a long period of time.

The width of the groove 401 is preferably 0.10 µm or more and less than 3.0 µm, and more preferably 0.20 µm or more and less than 2.0 µm. By setting the width of the groove within the above range, it is possible to maintain the transferability of the toner and maintain the image quality of the electrophotographic belt. As the processing method for forming the groove, for example, the known processing method such as cutting, etching, or imprinting can be used. From the viewpoint of the processing reproducibility or the processing cost of the groove, the imprint processing is preferable.

The thickness of the electrophotographic belt 405 is preferably 10 µm or more and 500 µm or less, and particularly preferably 30 µm or more or 150 µm or less. Further, the electrophotographic belt 405 according to the present invention may be used as a belt shape, or may be used with being wound around or coated on a drum, a roll, or the like used as an electrophotographic member.

<Electrophotographic Image Forming Apparatus>

An electrophotographic image forming apparatus according to an aspect of the present disclosure includes the above-described electrophotographic endless belt according to the present aspect as an intermediate transfer belt. An example of an embodiment of an electrophotographic image forming apparatus will be described with reference to FIG. 1. The image forming apparatus according to the embodiment of the present disclosure has a so-called tandem type configuration in which image forming stations of colors are arranged side by side in the rotation direction of the electrophotographic endless belt (hereinafter, referred to as "intermediate transfer belt"). In the following description, subscripts of Y, M, C, and k are added to reference numerals of components related to each color of yellow, magenta, cyan, and black, but the subscripts may be omitted for similar components.

Reference numerals 1Y, 1M, 1C, and 1k in FIG. 1 are photosensitive drums (photosensitive members and image carriers), and charging devices 2Y, 2M, 2C, and 2k, exposure devices 3Y, 3M, 3C, 3k, developing devices 4Y, 4M, 4C, 4k, and an intermediate transfer belt (intermediate transfer body) 6 are disposed around the photosensitive drum 1. The photosensitive drum 1 is rotatably driven in the direction of arrow F at a predetermined peripheral speed (process speed). The charging device 2 charges the peripheral surface of the photosensitive drum 1 with a predetermined polarity and potential (primary charging). The laser beam scanner as the exposure device 3 outputs an on/off modulated laser beam corresponding to image information input from an external device such as an image scanner (not illustrated) or a computer, and performs scanning exposure on a charging processing surface on the photosensitive drum 1. By this scanning exposure, an electrostatic latent image corresponding to target image information is formed on the surface of the photosensitive drum 1.

The developing devices 4Y, 4M, 4C, and 4k each contain toners of color components of yellow (Y), magenta (M), cyan (C), and black (k), respectively. Then, the developing device 4 to be used is selected based on the image information, the developer (toner) is developed on the surface of the photosensitive drum 1, and the electrostatic latent image is visualized as the toner image. In this embodiment, a reversal development method is used in which the toner is attached to the exposed portion of the electrostatic latent image and developed. In addition, the charging device, the exposure device, and the developing device constitute an image forming unit.

In addition, the intermediate transfer belt 6 is the electrophotographic endless belt according to the present embodiment, and is disposed so as to be in contact with the surface of the photosensitive drum 1, and is stretched around stretching rollers 20, 21, and 22. The intermediate transfer belt 6 is rotated in a direction of arrow G. In the present embodiment, the stretching roller 20 is a stretching roller that controls the tension of the intermediate transfer belt 6 to be constant, the stretching roller 22 is a driving roller for the intermediate transfer belt 6, and the stretching roller 21 is a counter roller for secondary transfer. Further, primary transfer rollers 5Y, 5M, 5C, and 5k are each disposed at primary transfer positions facing the photosensitive drum 1 with the intermediate transfer belt 6 interposed therebetween. Each color unfixed toner image formed on the photosensitive drum 1 is primarily transferred onto the intermediate transfer belt 6 sequentially in an electrostatic manner by applying a primary transfer bias having a polarity opposite to the charging polarity (for example, positive polarity) of the toner to the primary transfer roller 5 by a constant voltage source or a constant current source. Then, a full color image is obtained in which four color unfixed toner images are superimposed on the intermediate transfer belt 6. The intermediate transfer belt 6 is rotated while carrying the toner image transferred from the photosensitive drum 1 in this way. Whenever the photosensitive drum 1 rotates after the primary transfer, the surface of the photosensitive drum 1 enters a process of cleaning the residual toner after the transfer with the cleaning device 11, and repeating image formation.

Further, a secondary transfer roller (transfer portion) 9 is disposed at the secondary transfer position of the intermediate transfer belt 6 facing the conveyance path of the recording material 7 in pressure contact with the toner image carrying surface side of the intermediate transfer belt 6. In addition, the counter electrode of the secondary transfer roller 9 is not disposed, and the counter roller 21 to which the bias is applied is disposed, on the back surface side of the intermediate transfer belt 6 at the secondary transfer position. When the toner image on the intermediate transfer belt 6 is transferred to the recording material 7, a bias having the same polarity as the toner is applied to the counter roller 21 by a transfer bias applying unit 28, and for example, −1000 to −3000 V is applied thereto and a current of −10 to −50 μA flows therein. At this time, the transfer voltage is detected by a transfer voltage detecting unit 29. Further, the cleaning device (belt cleaner) 12 for removing the toner remaining on the intermediate transfer belt 6 after the secondary transfer is provided on the downstream side of the secondary transfer position.

The recording material 7 introduced into the secondary transfer position is nipped and conveyed at the secondary transfer position, and at that time, a constant voltage bias (transfer bias) controlled in a predetermined manner is applied from the secondary transfer bias applying unit 28 to the counter roller 21 of the secondary transfer roller 9. The transfer bias having the same polarity as the toner is applied to the counter roller 21 so that four color full-color images (toner images) superimposed on the intermediate transfer belt 6 at the transfer portion are collectively transferred to the recording material 7 and the full color unfixed toner image is formed on the recording material. The recording material 7 having received the transfer of the toner image is introduced into a fixing device (not illustrated) and fixed by heating.

According to an aspect of the present disclosure, it is possible to obtain the electrophotographic belt that is excellent in the creep resistance and can prevent the transfer position of the toner from being shifted during the secondary transfer. In addition, according to another aspect of the present disclosure, it is possible to obtain the electrophotographic image forming apparatus capable of forming a high-quality electrophotographic image.

EXAMPLE

The present invention will be specifically described below with reference to examples and comparative examples, but the present invention is not limited thereto. Characteristic values or and performance evaluation methods of an electrophotographic endless belt produced in Examples and Comparative Examples are as the following [Evaluation 1] to [Evaluation 5].

[Evaluation 1] Matrix and Domain Structure of Electrophotographic Endless Belt

A sample cut out from the electrophotographic endless belt with a microtome was embedded in an epoxy resin, and after the epoxy resin is cured, a cross section of the electrophotographic belt was exposed with the microtome to prepare a slice. Thereafter, the section of the slice was observed at an acceleration voltage of 200 kV, a beam diameter of 1 nm, and a magnification of 400,000 by using a field emission electron microscope (trade name: JEM2100FX; manufactured by JEOL).

At the same time, element mapping was analyzed with an energy dispersive X-ray analyzer (trade name: JED-2300T; manufactured by JEOL). Thereby, a thermoplastic resin and an ionic electroconductive agent constituting a matrix and domain structure in a cross-sectional photograph were distinguished. The results were evaluated based on the following criteria.

<Evaluation Criteria>

Rank A: It has the matrix of the thermoplastic resin and domain structure of the ionic electroconductive agent.

Rank B: It does not have the matrix of the thermoplastic resin and domain structure of the ionic electroconductive agent.

[Evaluation 2] Surface Resistivity of Electrophotographic Endless Belt

The surface resistivity of the electrophotographic endless belt in a circumferential direction and the surface resistivity of the electrophotographic endless belt in a direction orthogonal to the circumferential direction were measured by using a high resistivity meter (Hiresta-UP (MCP-HT450); Manufactured by Mitsubishi Chemical Analytech Co., Ltd.) and a UA probe (pin spacing: 20 mm, pin tip: 2Φ×2, spring pressure: 240 g/pin; Manufactured by Mitsubishi Chemical Analytech Co., Ltd.) that is a dedicated probe. The surface resistivity of the electrophotographic endless belt in the circumferential direction was measured under the conditions that an applied voltage is 500 V and an applied time is 10 seconds by disposing the UA probe so that a straight line connecting two pins of the UA probe is parallel to the circumferential direction of the electrophotographic belt.

The surface resistivity of the electrophotographic endless belt in the direction orthogonal to the circumferential direction was measured under the conditions that an applied voltage is 500 V and an applied time is 10 seconds by disposing the UA probe so that a straight line connecting two pins of the UA probe is parallel to the direction orthogonal to the circumferential direction of the electrophotographic belt. An average value was calculated by measuring four points at 90° phase with respect to the circumferential direction.

[Evaluation 3] Tensile Modulus of Elasticity of Electrophotographic Endless Belt in the Circumferential Direction An electrophotographic endless belt was cut into a strip with a width of 10 mm and a length of 50 mm along the circumferential direction, and both ends of the strip sheet were fixed with a chuck by using a material tensile tester (Instron 5582; manufactured by Instron Co.). A tensile modulus of elasticity was measured from an inter-chuck distance of 10 mm, pulling at a tensile speed of 5 mm/min, and a stress value at a strain amount of 1%. The measurement was performed at N=5, and an average value was calculated.

[Evaluation 4] Creep Characteristic of Electrophotographic Endless Belt

An electrophotographic image forming apparatus (trade name: LBP712Ci, manufactured by Canon Inc.) having the configuration illustrated in FIG. 1 was used, and an intermediate transfer belt as the electrophotographic belt 405 was mounted. The intermediate transfer belt of the electrophotographic image forming apparatus is stretched between a drive roller having a diameter of 18 mm and a tension roller having a diameter of 15 mm with a stretch stress of 6 kgf. A laser beam printer stood for 1 month under the environment that a temperature is 35° C. and a relative humidity is 95%. Next, the laser beam printer stood for one day under the environment that a temperature is 35° C. and a relative humidity is 95% while an electroconductive belt was driven to rotate slightly and a portion contacting the drive roller at the time of standing is away from the drive roller. Thereafter, a magenta halftone image was output. This halftone image was visually observed, and a contact mark of the drive roller when the electrophotographic endless belt stands was evaluated with the following criteria.

<Evaluation Criteria>

Rank A: The contact mark of the drive roller cannot be visually determined from the image.

Rank B: The contact mark of the drive roller can be slightly confirmed by a shading of an image.

Rank C: The contact mark of the drive roller can be clearly confirmed by the shading of the image.

[Evaluation 5] Digital Reproducibility of Electrophotographic Image Forming Apparatus An image was obtained by using the electrophotographic image forming apparatus having the configuration illustrated in FIG. 1, mounting the intermediate transfer belt as the electrophotographic endless belt, outputting an unfixed image when a thin line image (seven/1 mm) is transferred onto paper, and fixing the unfixed image without pressure using an oven of 100° C. The image was observed with a loupe and the presence or absence of toner scattering in each thin line image was confirmed, and was evaluated according to the following criteria.

<Evaluation Criteria>

Rank A: The number of thin line images in which the toner scattering occurs is zero.

Rank B: The number of thin line images in which the toner scattering occurs is one to three.

Rank C: The number of thin line images in which the toner scattering is four or more.

The materials listed in Tables 1 and 2 below were each prepared as materials (thermoplastic resin, ionic electroconductive agent) used in the production of the electrophotographic endless belts according to Examples and Comparative Examples. Note that in Table 2, ionic liquids 1 to 3 have anions represented by the above Formula (1).

TABLE 1

| Thermoplastic resin name | Product name | Manufacturer |
|---|---|---|
| polyethylene terephthalate | TRN-8550FF | Manufactured by Teijin |
| Polyethylene naphthalate | Teonex TN-8065S | Manufactured by Teijin |
| Polymetaxylylene adipamide | MX nylon S6007 | Manufactured by Mitsubishi Gas Chemical Company |
| Polycarbonate | Panlite L-1225Y | Manufactured by Teijin |

TABLE 2

| Ionic electroconductive agent name | Product name | Manufacturer |
|---|---|---|
| Polyetheresteramide | TPAE10HP-10 | manufactured by T & K TOKA |
| Polyetheramide | Pebax 2533 | Manufactured by Arkema |
| Ionic electrolyte | Nonafluorobutane Potassium sulfonate | Manufactured by Mitsubishi Materials |
| Ionic liquid 1 (tri-n-butylmethylammonium bistrifluoromethane-sulfonimide) | FC-4400 | Manufactured by Sumitomo 3M |
| Ionic liquid 2 (tri-n-octylmethylammonium bistrifluoromethane-sulfonimide) | IL-A2 | Manufactured by Guangei Chemical Industry Co., Ltd. |
| Ionic liquid 3 (consisting of pyridinium cation and bistrifluoromethane-sulfonimide anion) | IL-P14 | Manufactured by Guangei Chemical Industry Co., Ltd. |

Example 1

A resin composition was prepared by hot-melt kneading in the mixing shown in Table 3 by using a twin screw kneading extruder (trade name: TEX30α; manufactured by Nippon Steel Works Co., Ltd.). The hot melt kneading temperature was adjusted to be in the range of 260° C. or higher and 280° C. or lower, and the hot melt kneading time was about 3 to 5 minutes. The obtained resin composition was pelletized and dried at a temperature of 140° C. for 6 hours.

Figure 2:
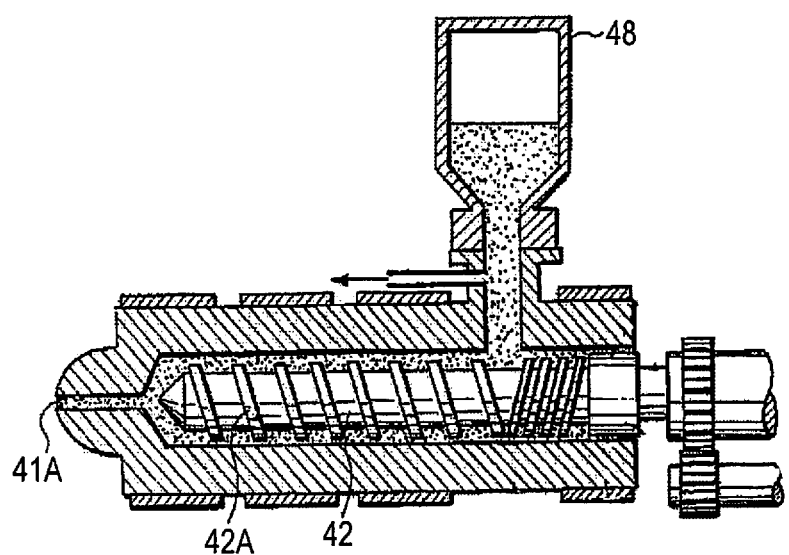
FIG. 2 is a schematic view illustrating an example of an injection molding apparatus.

The dried pellet of the resin composition was put into a hopper 48 of an injection molding apparatus (SE180D, manufactured by Sumitomo Heavy Industries, Ltd.) having the configuration illustrated in FIG. 2. Then, a preform 104 having a height of 80 mm and a diameter of 50 mm was prepared by setting a set temperature of a cylinder to 290° C., being melted in screws 42 and 42A, and being injection-molded into a mold through a nozzle 41A. At this time, the injection molding temperature was 30° C. The preform 104 was put into a heating device 107 of a temperature of 500° C. and softened, and then was heated at 500° C.

Figure 3:
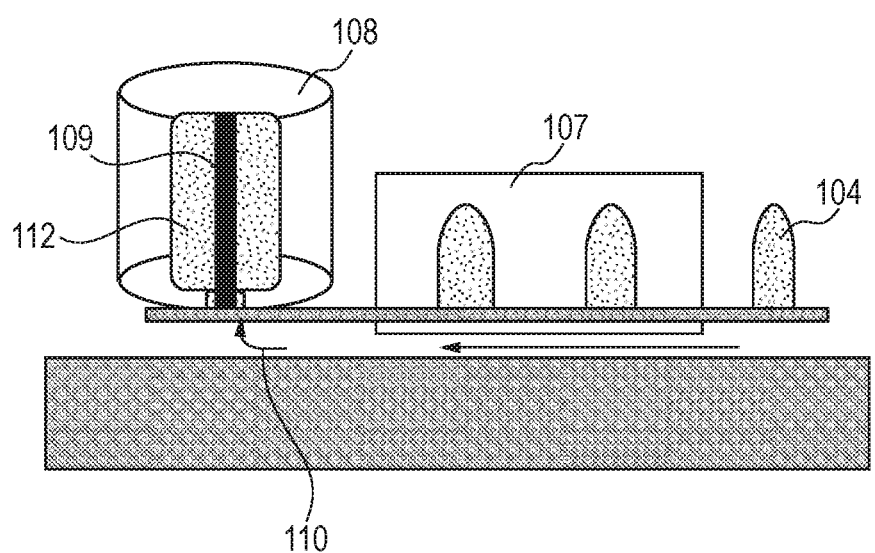
FIG. 3 is a schematic view illustrating an example of a method for manufacturing an electrophotographic endless belt using a stretch blow molding machine.

Thereafter, the preform 104 was put into a blow molding machine illustrated in FIG. 3. A blow bottle 112 was obtained by adjusting the temperature of the preform temperature to be 105° C. or higher and 165° C. or lower with a stretching rod 109 and an air force (blow air injection portion 110) in a blow mold 108 having a height of 400 mm and a diameter of 226 mm while the temperature of the mold is maintained at 110° C. and blow-molding the preform at an air pressure of 0.3 MPa and a stretching rod speed of 1,000 mm/s. An electroconductive belt having an endless belt shape was obtained by cutting both ends of the blow bottle. A stretch ratio of the blow bottle in a height direction was 5.00 times and the stretch ratio of the blow bottle in a radial direction was 4.52 times. The obtained electrophotographic endless belt had a width of 246 mm, a circumferential length of 712 mm, and a thickness of 70 The evaluation results of the electrophotographic endless belt are shown in Table 3.

Examples 2 to 9

An electrophotographic endless belt was produced and evaluated in the same manner as in Example 1 except that the thermoplastic resin and the ionic electroconductive agent were mixed in the composition shown in Table 3.

Example 10

An electrophotographic endless belt was produced and evaluated in the same manner as in Example 1 except that the preform having a height of 88.5 mm and a diameter of 50 mm was produced. At this time, a stretch ratio of a blow bottle in a height direction was 4.52 times and the stretch ratio of the blow bottle in a radial direction was 4.52 times.

Example 11

An electrophotographic endless belt was produced and evaluated in the same manner as in Example 1 except that the preform having a height of 70 mm and a diameter of 55 mm was produced. At this time, a stretch ratio of a blow bottle in a height direction was 5.71 times and the stretch ratio of the blow bottle in a radial direction was 4.11 times.

Example 12

An electrophotographic endless belt was produced and evaluated in the same manner as in Example 1 except that the preform having a height of 60 mm and a diameter of 60 mm was produced. At this time, a stretch ratio of a blow bottle in a height direction was 6.67 times and the stretch ratio of the blow bottle in a radial direction was 3.77 times.

The evaluation results of the electrophotographic endless belts according to Examples 1 to 12 are also shown in Table 3.

TABLE 3

| | Example | 1 | 2 | 3 | 4 | 5 | 6 | 7 | 8 | 9 | 10 | 11 | 12 |
|---|---|---|---|---|---|---|---|---|---|---|---|---|---|
| Composition Weight ratio | Polyethylene terephthalate | 80 | 80 | 80 | 80 | 95 | 95 | — | — | — | 80 | 80 | 80 |
| | Polyethylene naphthalate | — | — | — | — | — | — | 95 | — | — | — | — | — |
| | Polymetaxylylene adipamide | — | — | — | — | — | — | — | 95 | — | — | — | — |
| | Polycarbonate | — | — | — | — | — | — | — | — | 95 | — | — | — |
| | Polyetheresteramide | 20 | — | 15 | 15 | — | — | — | — | — | 20 | 20 | 20 |
| | Polyetheramide | — | 20 | — | — | — | — | — | — | — | — | — | — |
| | Ionic electrolyte | — | — | 5 | — | — | — | — | — | — | — | — | — |
| | Ionic liquid 1 | — | — | — | 5 | — | — | 5 | 5 | 5 | — | — | — |
| | Ionic liquid 2 | — | — | — | — | 5 | — | — | — | — | — | — | — |
| | Ionic liquid 3 | — | — | — | — | — | 5 | — | — | — | — | — | — |
| [Evaluation 1] Matrix domain structure Evaluation rank | | A | A | A | A | A | A | A | A | A | A | A | A |
| [Evaluation 2] Electrical resistivity in the belt circumferential direction (Log(Ω/□)) | | 11.8 | 11.9 | 11.1 | 9.2 | 11.7 | 11.8 | 11.5 | 11.4 | 11.3 | 11.6 | 11.4 | 11.3 |
| [Evaluation 2] Electrical resistivity in the direction orthogonal to the belt circumferential direction (Log(Ω/□)) | | 11.5 | 11.7 | 10.8 | 8.9 | 11.4 | 11.6 | 11.2 | 11.1 | 11.1 | 11.6 | 11.0 | 10.7 |
| [Evaluation 3] Tensile elastic modulus of belt (GPa) | | 1.2 | 1.2 | 1.3 | 1.4 | 1.4 | 1.4 | 2.8 | 2.2 | 2.6 | 1.2 | 1.2 | 1.3 |
| [Evaluation 4] Creep characteristics of belt Evaluation rank | | B | B | B | B | B | B | A | B | A | B | B | B |
| [Evaluation 5] Digital reproducibility of electrophotographic image forming apparatus Evaluation rank | | A | A | A | A | A | A | A | A | A | B | A | A |

Comparative Examples 1 and 2

An electrophotographic endless belt was produced and evaluated in the same manner as in Example 1 except that the thermoplastic resin and the ionic electroconductive agent were mixed in the composition shown in Table 4.

Comparative Example 3

An electrophotographic endless belt was produced and evaluated in the same manner as in Example 1 except that the preform having a height of 200 mm and a diameter of 80 mm was produced. At this time, a stretch ratio of a blow bottle in a height direction was 2.00 times and the stretch ratio of the blow bottle in a radial direction was 2.83 times.

Comparative Example 4

An electrophotographic endless belt was produced and evaluated in the same manner as in Example 1 except that the preform having a height of 70 mm and a diameter of 45 mm was produced. At this time, a stretch ratio of a blow bottle in a height direction was 5.71 times and the stretch ratio of the blow bottle in a radial direction was 5.02 times.

Comparative Example 5

An electrophotographic endless belt was produced and evaluated in the same manner as in Example 1 except that the preform having a height of 120 mm and a diameter of 60 mm was produced. At this time, a stretch ratio of a blow bottle in a height direction was 3.33 times and the stretch ratio of the blow bottle in a radial direction was 3.76 times.

Comparative Example 6

An electrophotographic endless belt was produced and evaluated in the same manner as in Example 1 except that the preform having a height of 120 mm and a diameter of 50 mm was produced. At this time, a stretch ratio of a blow bottle in a height direction was 3.33 times and the stretch ratio of the blow bottle in a radial direction was 4.52 times.

Comparative Examples 7 and 11

An electrophotographic endless belt was prepared and evaluated in the same manner as in Example 1 except that the thermoplastic resin and the ionic electroconductive agent were mixed in the composition described in Table 4 and the preform having a height of 120 mm and a diameter of 50 mm was prepared. At this time, a stretch ratio of a blow bottle in a height direction was 3.33 times and the stretch ratio of the blow bottle in a radial direction was 4.52 times.

The evaluation results of the electrophotographic endless belts according to Comparative Examples 1 to 11 are also shown in Table 4.

Results and Study

Examples 1 to 9 and 11 and 12

In Examples 1 to 9 and 11 and 12, a surface resistivity of a belt in a direction orthogonal to a circumferential direction is lower than that of the belt in the circumferential direction, and a tensile modulus of elasticity of the belt is in the range of 1.0 to 3.0 GPa, so creep resistance and digital reproducibility were excellent.

Example 10

In Example 10, a surface resistivity of a belt in a circumferential direction is equal to that of the belt in a direction orthogonal to the circumferential direction, and a tensile modulus of elasticity of the belt is in the range of 1.0 to 3.0 GPa, so creep resistance and digital reproducibility were excellent.

Comparative Examples 1 and 2

In Comparative Examples 1 and 2, since a mixed amount of ionic electroconductive agent is large and thus the belt does not have a matrix and domain structure, creep resistance and digital reproducibility were inferior.

Comparative Examples 3 and 4

In Comparative Examples 3 and 4, since the stretch ratio is too low or too high and thus the tensile modulus of elasticity of the belt was outside the range of 1.0 to 3.0 GPa, the creep resistance was inferior.

Comparative Examples 5 to 11

In Comparative Examples 5 to 11, since a stretch ratio of a blow bottle in a radial direction is higher than that of the

TABLE 4

| | Comparative Example | 1 | 2 | 3 | 4 | 5 | 6 | 7 | 8 | 9 | 10 | 11 |
|---|---|---|---|---|---|---|---|---|---|---|---|---|
| Composition Weight ratio | polyethylene terephthalate | 40 | 80 | 80 | — | 80 | 80 | 85 | 95 | 95 | 95 | — |
| | Polyethylene naphthalate | — | — | — | 97 | — | — | — | — | — | — | — |
| | Polymetaxylylene adipamide | — | — | — | — | — | — | — | — | — | — | — |
| | Polycarbonate | — | — | — | — | — | — | — | — | — | — | 95 |
| | Polyetheresteramide | 60 | — | 20 | — | 20 | 20 | 15 | — | — | — | — |
| | Polyetheramide | — | — | — | — | — | — | — | — | — | — | — |
| | Ionic electrolyte | — | — | — | — | — | — | 5 | — | — | — | — |
| | Ionic liquid 1 | — | 20 | — | 3 | — | — | — | 5 | — | — | 5 |
| | Ionic liquid 2 | — | — | — | — | — | — | — | — | 5 | — | — |
| | Ionic liquid 3 | — | — | — | — | — | — | — | — | — | 5 | — |
| [Evaluation 1] Matrix domain structure Evaluation rank | | B | B | A | A | A | A | A | A | A | A | A |
| [Evaluation 2] Electrical resistivity in the belt circumferential direction (Log($\Omega/\square$)) | | 9.8 | 8.7 | 11.8 | 12.3 | 11.5 | 11.3 | 10.8 | 11.2 | 11.3 | 11.4 | 11.2 |
| [Evaluation 2] Electrical resistivity in the direction orthogonal to the belt circumferential direction (Log($\Omega/\square$)) | | 10.1 | 9.1 | 11.5 | 12.1 | 11.7 | 11.8 | 11.1 | 11.5 | 11.6 | 11.6 | 11.5 |
| [Evaluation 3] Tensile elastic modulus of belt (GPa) | | 0.5 | 1.8 | 0.8 | 3.3 | 1.2 | 1.3 | 1.4 | 1.4 | 1.4 | 1.4 | 2.5 |
| [Evaluation 4] Creep characteristics of belt Evaluation rank | | C | B | C | C | B | B | B | B | B | B | A |
| [Evaluation 5] Digital reproducibility of electrophotographic image forming apparatus Evaluation rank | | C | C | A | A | C | C | C | C | C | C | C | blow bottle in a height direction and thus a surface resistivity of a belt in a direction orthogonal to a circumferential direction is higher than that of the belt in the circumferential direction, digital reproducibility was inferior.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-227577, filed Dec. 4, 2018, and Japanese Patent Application No. 2019-188745, filed Oct. 15, 2019, which are hereby incorporated by reference herein in their entirety.

What is claimed is:

1. An electrophotographic belt comprising a biaxially stretched cylindrical film, the biaxially stretched cylindrical film comprising:

a matrix including a thermoplastic resin; and an electroconductive domain including an ionic electroconductive agent, wherein A≥B when A (Ω/□) is a surface resistivity of the biaxially stretched cylindrical film in a circumferential direction on an outer peripheral surface thereof, and B (Ω/□) is a surface resistivity of the biaxially stretched cylindrical film in a direction orthogonal to the circumferential direction on the outer peripheral surface thereof, and a tensile modulus of elasticity of the biaxially stretched cylindrical film in the circumferential direction is 1.0 to 3.0 GPa.

2. The electrophotographic belt according to claim 1, wherein the thermoplastic resin is polyester.

3. The electrophotographic belt according to claim 2, wherein the polyester is at least one member selected from the group consisting of polyethylene terephthalate and polyethylene naphthalate.

4. The electrophotographic belt according to claim 1, wherein the ionic electroconductive agent includes at least one member selected from the group consisting of polyetheresteramide and an ionic liquid.

5. The electrophotographic belt according to claim 4, wherein the ionic liquid contains an anion represented by Formula (1)

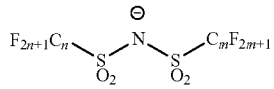

where m and n independently represent an integer of 1 to 4.

6. The electrophotographic belt according to claim 1, wherein each of surface resistivities A and B is in a range of $1\times10^8$ to $1\times10^{12}$ (Ω/□).

7. The electrophotographic belt according to claim 1, wherein the electrophotographic belt has grooves on an outer peripheral surface thereof.

8. The electrophotographic belt according to claim 7, wherein when it is assumed that a straight line is put on the outer peripheral surface in a direction orthogonal to a circumferential direction of the electrophotographic belt, the grooves intersect the straight line and extend in a direction non-parallel to the circumferential direction.

9. The electrophotographic belt according to claim 8, wherein the outer peripheral surface consists of:

a first area in which the number of grooves intersecting the straight line is n, where n is an integer of 1 or more, and a second area in which the number of grooves intersecting the straight line is larger than n, the first area and the second area being alternately disposed in the circumferential direction of the electrophotographic belt.

10. The electrophotographic belt according to claim 1, wherein the electrophotographic belt is an intermediate transfer belt.

11. An electrophotographic image forming apparatus including an electrophotographic belt as an intermediate transfer belt, the electrophotographic belt comprising a biaxially stretched cylindrical film comprising:

a matrix including a thermoplastic resin; and an electroconductive domain including an ionic electroconductive agent, wherein A≥B when A (Ω/□) is a surface resistivity of the biaxially stretched cylindrical film in a circumferential direction on an outer peripheral surface thereof, and B (Ω/□) is a surface resistivity of the biaxially stretched cylindrical film in a direction orthogonal to the circumferential direction on the outer peripheral surface thereof, and a tensile modulus of elasticity of the biaxially stretched cylindrical film in the circumferential direction is 1.0 to 3.0 GPa.

* * * * *